(12) United States Patent
Labeau et al.

(10) Patent No.: US 11,028,282 B2
(45) Date of Patent: Jun. 8, 2021

(54) PROCESS FOR BONDING HYDROPHOBIC SURFACES HAVING CATIONIC GUAR-CONTAINING PRIMER COATING THEREON

(71) Applicant: RHODIA OPERATIONS, Paris (FR)

(72) Inventors: Marie-Pierre Labeau, Sevres (FR); Marylise Mangeol, Asnieres sur Seine (FR)

(73) Assignee: Rhodia Operations, Paris (FR)

(*) Notice: Subject to any disclaimer, the term of this patent is extended or adjusted under 35 U.S.C. 154(b) by 0 days.

(21) Appl. No.: 15/769,425

(22) PCT Filed: Oct. 20, 2016

(86) PCT No.: PCT/EP2016/075142
§ 371 (c)(1),
(2) Date: Apr. 19, 2018

(87) PCT Pub. No.: WO2017/068010
PCT Pub. Date: Apr. 27, 2017

(65) Prior Publication Data
US 2018/0305571 A1    Oct. 25, 2018

(30) Foreign Application Priority Data

Oct. 20, 2015   (FR) .................. 15 306682.4

(51) Int. Cl.
| | | |
|---|---|---|
| *B32B 37/12* | (2006.01) | |
| *C09D 101/28* | (2006.01) | |
| *C09D 5/00* | (2006.01) | |
| *C09D 105/00* | (2006.01) | |
| *C09D 103/04* | (2006.01) | |
| *C09D 103/08* | (2006.01) | |
| *C09J 101/28* | (2006.01) | |
| *C09J 103/08* | (2006.01) | |
| *C09J 105/00* | (2006.01) | |

(52) U.S. Cl.
CPC ......... *C09D 101/288* (2013.01); *B32B 37/12* (2013.01); *C09D 5/00* (2013.01); *C09D 5/002* (2013.01); *C09D 103/04* (2013.01); *C09D 103/08* (2013.01); *C09D 105/00* (2013.01); *C09J 101/288* (2013.01); *C09J 103/08* (2013.01); *C09J 105/00* (2013.01); *B32B 2037/1276* (2013.01)

(58) Field of Classification Search
CPC ...... C09D 101/28; C09D 5/00; C09D 103/04; C09D 105/00; B32B 2037/1276; B32B 37/12; B32B 37/1292; C08J 5/127
See application file for complete search history.

(56) References Cited

U.S. PATENT DOCUMENTS

| | | | |
|---|---|---|---|
| 6,833,347 B1 | 12/2004 | Wang et al. | |
| 8,883,262 B2 * | 11/2014 | Bendejacq | ............ C08L 101/02 427/337 |
| 2013/0261044 A1 * | 10/2013 | Lambert | .................. C11D 3/30 510/400 |

FOREIGN PATENT DOCUMENTS

| | | | |
|---|---|---|---|
| EP | 2682419 A1 | 1/2014 | |
| WO | 2008144744 A2 | 11/2008 | |
| WO | WO-2008144744 A2 * | 11/2008 | ............. C11D 3/227 |
| WO | 2009099567 A2 | 8/2009 | |
| WO | 2010014219 A1 | 2/2010 | |
| WO | 2012042000 A1 | 4/2012 | |

OTHER PUBLICATIONS

Written Opinion for EP 15 306 682.4, 3 pages. (Year: 2016).*
Peter Roos et al: "Hydrophilic Monolayer Formation of Adsorbed Cationic Starch and Cationic Hydroxyethyl Cellulose Derivatives on Polyester Surfaces", Bioscience Biotechnology Biochemistry., vol. 68, No. 11, Jan. 22, 2004, pp. 2247-2256, XP055264765, Tokyo, Japan ISSN: 0916-8451, DOI: 10.1271/bbb.68.2247 the whole document.

* cited by examiner

*Primary Examiner* — William P Fletcher, III
(74) *Attorney, Agent, or Firm* — Osha Bergman Watanabe & Burton LLP

(57) ABSTRACT

The instant invention relates to primary coating compositions that comprises a cationic polysaccharide, to be applied on a hydrophobic surface before a subsequent application of a polar or water based coating composition, such a as a paint or an adhesive.

6 Claims, No Drawings

PROCESS FOR BONDING HYDROPHOBIC SURFACES HAVING CATIONIC GUAR-CONTAINING PRIMER COATING THEREON

This application is a U.S. national phase entry under 35 U.S.C. § 371 of International Application No. PCT/EP2016/075142, filed on Oct. 20, 2016, which claims priority to French Application No. 15306682.4, filed on Oct. 20, 2015. The entire contents of these applications are explicitly incorporated herein by this reference.

The instant invention relates to the coating of hydrophobic surfaces, notably plastic surfaces, with polar compositions having a low affinity with said hydrophobic surfaces, notably aqueous compositions or more generally polar coating compositions such as waterborne paints (or more generally any polar coating composition such as a polar paint, varnish or adhesive composition).

More precisely, the invention relates to specific primary coating compositions to be applied on hydrophobic surfaces and that enhance the efficiency of the subsequent deposit on an aqueous composition, and especially an aqueous coating composition, or more generally a polar composition, especially a polar coating composition, on the treated surface.

As used herein, the term "hydrophobic surface" refers to a surface exhibiting a tendency to repel water, said surface having typically a water contact angle greater than or equal to 70°, typically of at least 75°, for example greater than or equal 80°, and typically greater than or equal to 90°, and/or said surface having a free energy of less than or equal to about 40 dynes/cm (for this reason, a hydrophobic surface will also be referred as a "low surface energy surface"). Typically, hydrophobic surfaces according to the instant specification include surfaces of hydrophobic plastics, such as, for instance, polyolefins (e.g. polyethylene or polypropylene), polystyrene, poly(vinyl chloride), Acrylonitrile Butadiene Styrene copolymers (ABS) or polyamides By definition, aqueous compositions (namely composition including an aqueous solvent, such as water or a alcohol-water mixture) cannot be easily applied onto hydrophobic surfaces. Such aqueous compositions tend to retract after application, or even to form droplets on the surfaces and they are therefore generally not suitable for applying a continuous film on the surface. This is especially the case when waterborne paints are applied on hydrophobic surfaces such as surfaces of plastics, especially those recited above. More generally, it is difficult to apply, onto an hydrophobic surface, a composition having a polarity higher than said hydrophobic surface.

According to the instant description, a composition being "more polar" than a given surface, also referred as a "polar composition" for said surface, is defined by a liquid composition having a contact angle with said surface greater than or equal to 70°, for example of at least 75°, for example greater than or equal to 80°, and typically greater than or equal to 90°.

The instant invention aims at providing means for enhancing the deposit of aqueous compositions, especially coating compositions, onto hydrophobic surfaces, and more generally for enhancing the deposit, onto hydrophobic surfaces, of coating compositions regarded as polar compositions for said surface, according to the definition given in the previous paragraph (which are more simply referred as "polar composition" in the instant description for seek of concision). To this end, according to the instant invention, it is provided the use of a specific cationic polymer for applying a primary coating onto a hydrophobic surface and thereby rendering said surface more proper to a subsequent application of an aqueous or polar composition, especially an aqueous composition such as a water-based paint or any polar coating composition such as a polar paint, varnish or adhesive composition The primary coating of the invention renders more efficient the coating of the polar coating composition on the surface treated according to the invention.

More precisely, according to a first aspect, one subject-matter of the instant invention is a primary coating composition that comprises a cationic polysaccharide. This primary coating composition is to be applied on a hydrophobic surface before a subsequent application of a polar or water based composition. Such a composition is advantageously, but not necessarily, free from compounds able to interfere with the cationic polysaccharide. Preferably, a primary coating composition according to the invention is free from any ionic surfactant. It may optionally include nonionic surfactant. According to a specific embodiment, a composition according to the invention may contain an alkylpolyglucoside (APG).

According to another aspect, one further subject-matter of the invention is the use of a cationic polysaccharide (typically in the form of the primary coating composition defined in the previous paragraph) for modifying the properties of a hydrophobic surface in order to render it more hydrophilic. Especially, this use of the cationic polysaccharide may be implemented in view of a subsequent application of an aqueous composition (or a polar composition), especially a coating composition onto said surface that is rendered more hydrophilic (or, more generally speaking, more wettable by a polar composition).

As used herein, the expression "render a surface more hydrophilic" means decreasing the water contact angle of the surface. As used in the instant description, "water contact angle" of a surface means the angle exhibited by a droplet of water on the surface as measured by a conventional image analysis method, that is by disposing a droplet of water on the surface, typically a substantially flat surface, at 25° C., photographing the droplet, and measuring the contact angle shown in the photographic image.

Likewise, the expression "render a surface more wettable by a polar composition" as used herein, means decreasing the contact angle of the surface with the polar composition, the "contact angle" meaning the angle exhibited by a droplet of the polar composition on the surface as measured by a conventional image analysis method, that is by disposing a droplet of the composition on the surface, typically a substantially flat surface, at 25° C., photographing the droplet, and measuring the contact angle shown in the photographic image.

According to yet another aspect, the invention also relates to the use of a cationic polysaccharide (typically in the form of the primary coating composition defined in the previous paragraph) for modifying the properties of a hydrophobic surface in order to render more efficient the subsequent coating of pa polar coating composition on the treated surface. In this connection, another subject-matter of the invention is a process for applying a polar composition or an aqueous composition, preferably a polar or aqueous coating composition, for example a polar paint, a waterborne paint or a polar adhesive composition on a hydrophobic surface, that comprises the following steps:

(E1) the surface is contacted at least on certain zones with a cationic polysaccharide whereby a coating based on said cationic polysaccharide is obtained on said zones of the surfaces (E2) the polar or aqueous composition is applied on all or part of the zones of the surface covered by the cationic polysaccharide, as obtained in step (E1)

The inventors have now discovered that compositions of cationic polysaccharides may be easily applied onto hydrophobic surfaces (for example by applying a solution of the cationic polysaccharides on the surface to be treated and then eliminating the solvent, e.g. by drying) whereby the cationic polysaccharides form a stable coating on the surface, typically a coating that is not removed by rinsing. Besides, the obtained coating increases the surface energy of the surfaces and therefore enhances the subsequent deposit of aqueous composition onto the treated surface, and therefore especially enhance the efficiency of the application of a polar or aqueous coating on the surface and the adhesion of the applied coating.

Surprisingly, the inventors have now found that the cationic polysaccharide allow the modification of the hydrophobic surface without needing any additional use of surfactants, especially ionic surfactants that may otherwise affect the effect of the aqueous composition that is subsequently applied on the treated surface.

Besides, it occurs that the cationic polysaccharides can be used for treating any hydrophobic surface without the need of surface pretreatment. Especially, there is no need that the surface to be treated is anionic (even if it is not excluded). Besides, when cationic polysaccharides are used according to the present invention on the surface of plastics, there is no need for the plastics to have been preliminarily chemically or mechanically treated (e.g. by an activation treatment such as corona or plasma, or by oxidation), even if the use of such pretreatment is not excluded. According to a specific embodiment, interesting at least from an economical point of view, the hydrophobic surface treated according to the instant invention is a surface that, before applying the cationic polysaccharide of the invention, is not anionic and/or is not an oxidized plastic and/or is not a surface treated by an activation treatment such as corona or plasma.

Hence, generally speaking, the use of the cationic polysaccharide according to the invention allows the use of any aqueous or polar composition that does not negatively interact with the cationic polysaccharide, since no other compound is needed.

Especially, the invention makes it possible to optimize the application of a paint on the surface treated with the cationic polysaccharide. For this specific application, the surface is advantageously treated with the cationic polysaccharide in the absence of any ionic surfactants or at least with a content of ionic surfactant sufficiently low for not negatively affecting the properties of the paint coating.

Preferably, especially for a use for a deposit of paint, a primary coating composition according to the invention contains less than 1%, more preferably less than 0.5%, and even more preferably less than 0.1% by weight of ionic surfactant (and preferably less than 5%, more preferably less than 1% by weight of ionic compounds other than the cationic polysaccharide and their counter ion).

The invention is not specifically limited as regards the polar and aqueous coating compositions that may be applied on the surfaces treated according to the invention, e.g. according to step (E1).

According to a specific embodiment, the invention may be used for the subsequent deposit of any kind of aqueous or polar paint or of a varnish on the treated surface. Alternatively, the invention may be used for improving the deposit of an adhesive coating onto the treated surface.

For example, the invention may be implemented for improving the deposit, on a hydrophobic surface, of:
an waterborne paint;
a solvent-based paint, which is polar for the surface
a solvent-free paint (powder paint) which is polar for the surface.
a waterborne or polar adhesive.

Advantageously, the composition applied on the surfaces treated according to the invention contain compounds including chemical groups able to react with the —OH groups of the polysaccharides applied on the surface treated according to the invention.

As regards adhesive compositions, according to a specific embodiment, the invention may be used for bonding two surfaces, wherein one of the surface (if not both) is an hydrophobic surface treated according to the invention (the other one being the same, or, alternatively, any other surface, for example a metal surface or any other surface). According to this embodiment, the bonding typically includes an injection of a polar (e.g. but not necessarily aqueous) adhesive composition between the two surfaces, the deposit of which being de facto improved on the surface(s) treated according to the invention (namely at least the first one and possibly the second one if also treated according to the invention).

Features of the invention and specific embodiments will now be described in more details.

The Cationic Polysaccharide

Advantageously the cationic polysaccharide used according to the instant invention has a molecular weight between 20,000 and 5,000,000 g/mol, preferably between 20,000 and 4,000,000 g/mol; preferably between 100,000 and 3,000,000.

Besides, in most cases, the cationic group of the cationic polysaccharide is non-polymer cationic group.

Advantageously, the cationic polysaccharide of the invention is chosen among cationic celluloses, cationic starches, cationic guars and mixture thereof. The cationic polysaccharide is more preferably cationic cellulose and/or cationic guar.

Cationic starches, celluloses or guars useful in the invention especially include starch, cellulose or guar molecules modified by quaternary ammonium cationic groups, typically quaternary ammonium groups carrying three radicals, identical or different, and chosen in the group consisting of hydrogen and alkyl radical, said alkyl having preferably from 1 to 10 carbon atoms. The three radical carried by the quaternary ammonium groups of such a cationic polysaccharide useful in the instant invention are preferably three alkyl radicals, that may be identical or different, and most often identical. The counter ion of the quaternary ammonium group is generally a halogen, such as a chloride ion, or alternately a bromide or iodide.

According to a specific embodiment the cationic polysaccharide includes (or consists in) a cationic cellulose, in particular a cellulose ether such as those described in U.S. Pat. No. 6,833,347.

Cationic cellulose compounds useful in the invention especially include cellulose molecules modified by quaternary ammonium cationic groups, typically quaternary ammonium groups carrying three radicals which are identical or different and chosen in the group consisting of hydrogen, alkyl radical having from 1 to 10 carbon atoms, preferably from 1 to 6 carbon atoms, advantageously from 1 to 3 carbon atoms. The three radical carried by the quaternary ammonium groups of such a cationic cellulose useful in the instant invention are preferably three alkyl radicals, that may be identical or different, and most often identical. The counter ion of the quaternary ammonium group is generally a halogen, such as a chloride ion, or alternately a bromide or iodide.

Typically, a cationic cellulose useful according to the invention is modified by quaternary ammonium groups that are groups, such as trimethylammonium, triethylammonium, tributylammonium, aryldialkylammonium, especially benzyldimethylammonium, and/or ammonium radicals in which the nitrogen atom is a member of a cyclic structure, such as pyridinium and imidazoline, each in combination with a counter ion, especially chloride.

Preferred cationic cellulose includes cationic cellulose chosen in the group consisting of cellulose trimethyalmmonium-3 propyl poly(oxyethanediyl-1,2) hydroxyl-2 chloride and polyquaternium-10 (PQ10).

Useful cationic cellulose according to the invention also include the Ucar® product sold by Dow, especially Ucar® JR30M, Ucar® JR 400, Ucare® JR 125, Ucare® LR400 and Ucare® LK400.

According to another interesting embodiment, the cationic polysaccharide useful according to the instant invention includes (or consists in) a cationic guar. In that case, the cationic guar is typically advantageously guar modified by quaternary ammonium cationic group, typically quaternary ammonium group carrying three radicals which are identical or different and chosen in the group consisting of hydrogen, alkyl radical having from 1 to 22 carbon atoms, preferably from 1 to 14 carbon atoms, advantageously from 1 to 3 carbon atoms, those three radicals being preferably three alkyl radicals, identical or different (and often identical). The counter ion of the quaternary ammonium group is generally a halogen, such as a chloride ion, or alternately a bromide or iodide.

Typically, a cationic guar useful according to the invention is modified by quaternary ammonium groups that are are trialkylammonium groups, such as trimethylammonium, triethylammonium, tributylammonium, aryldialkylammonium, especially benzyldimethylammonium, and/or ammonium radicals wherein the nitrogen atom is a member of a cyclic structure, such as pyridinium and imidazoline, each in combination with a counter ion, especially chloride, bromide or iodide.

Cationic guars well adapted to the invention include modified guar obtained for example with the so-called "derivatisation" technique described in WO 2009/099567 and WO 2010/014219.

According to a possible, embodiment, the cationic polysaccharide used according to the instant invention includes (or consists in) a cationic guar wherein the cationic group of the cationic guar is linked to the reactive functional group of the cationisation agent, for example via an alkylene or oxyalkylene linking group.

Suitable cationisation groups are for example those chosen in the group consisting of cationic nitrogen compound functionalized with epoxy, such as for example, 2,3-epoxypropyltrimethylammonium chloride, cationic nitrogen compound functionalized with chloride such as for example 3-chloro-2-hydroxypropyl trimethylammonium chloride, 3-chloro-2-hydroxypropyllauryldimethylammonium chloride, 3-chloro-2-hydroxypropyl stearyldimethylammonium chloride, and cationic nitrogen compounds functionalized with vinyl or (meth)acrylamide functions, such as methacrylamidopropyltrimethylammonium chloride.

Alternatively, a cationic guar useful according to the invention may be a guar modified by hydroxypropyl ammonium groups, preferably modified by both hydroxypropyl ammonium groups and hydroxypropyl groups.

Such a modified guar can be obtained for example by reacting a guar gum with compounds such as 2,3-epoxypropyltrimethylammonium chloride or 3-chloro-2-hydroxypropyltrimethylammonium chloride.

Specific examples of cationic guar that can be used in the invention include Jaguar® 017, C14S and C13S commercialized by Solvay. Jaguar® 0162 and 0500 of Solvay are also suitable cationic polysaccharide for the instant invention. Jaguars Optima of Solvay is also a suitable cationic guar.

Advantageously, whatever its exact nature, the degree of cationic substitution (DScat) of a cationic polysaccharide according to the invention is preferably comprised between about 0.05 and 0.5, preferably between about 0.05 and 0.3, preferably between about 0.05 and 0.2. This degree of cationic substitution is especially suitable for the specific ammonium modified celluloses, starches and guars recited herein-above.

The expression "degree of cationic substitution" as used in the instant specification refers to the average number of moles of cationic substitution per mole of sugar unit.

Use of the Cationic Polysaccharide

Typically, the cationic polysaccharide as used in the instant invention, for instance but not necessarily in step (E1) of the process of the invention, is applied onto a hydrophobic surface to be treated in the form of a aqueous composition, typically comprising the polysaccharide dissolved or dispersed in water with a concentration of the polysaccharide in water of from 0.01% and 5% by weight based on the total weight of water and cationic polysaccharide. Surprisingly, the inventors have now found that the cationic copolymer in water is an aqueous that is able to properly wet most of the hydrophobic surfaces. The cationic polysaccharide may advantageously be used together with an alkylpolyglucoside (APG), especially for enhancing the homogeneity of its dispersion or dissolution in water.

Typically, in step (E1) of the process of the invention, a water solution including the polysaccharide is applied on the zones of the surface intended to be treated, the optional excess of water solution is removed (whereby only a wetting film is kept on the zones to be treated), and then the water is removed, typically by a drying.

Especially with the preferred cationic polysaccharide described herein-above, a coating of polysaccharide is obtained on the surface after step (E1) that is sufficiently stable for allowing an application of an aqueous composition in step (E2) without eliminating the coating performed in step (E1). Carrying out step (E1) before step (E2) substantially enhances the efficiency of the application of an aqueous composition, especially of a waterborne paint onto the treated surface.

The cationic polysaccharide of the invention may be used for treating a great number of hydrophobic surfaces, including without any limitation surfaces including hydrophobic polymers, such as polyolefins (e.g. polyethylene (for example high density polyethylene HDPE or low density polyethylene LDPE) or polypropylene), polystyrene, poly (vinyl chloride), polyethylene terephthalate, melamine, Acrylonitrile Butadiene Styrene copolymers (ABS), polyacrylate or polyamides.

According to a specific embodiment, the cationic polysaccharide of the invention may be used for depositing a primary coating on a surface that has been previously coated in all or part by a hydrophobic coating, for example a surface that has been previously painted by a glycero paint.

The advantages of the invention are illustrated in the following example that makes use of Jaguar® C162 as the cationic polysaccharide, used as an aqueous solution referred herein as "solution S" (0.1% by weight of the cationic polysaccharide in water—pH of about 6.8).

EXAMPLE

The example illustrates the effect of the deposition of the Jaguar® C162 as a primer before the coating of a paint. The paint which was used in this example is the epoxy white paint of Akzo Nobel commercialized in France under the name "Epoxy monocouche—Julien—peinture directe sur surface lisse—séchage rapide".

The primer was deposited on polyethylene surfaces (square of 2 cm×2 cm—thickness: 2 mm) and then the paint was applied on the treated polyethylene.

For seek of comparison, several tests were carried out with distinct conditions for the deposition of solution S, that are summarized in the table below.

In each test, the polyethylene surface was first cleaned with isopropanol by immersion during 30 minutes at 20° C., overnight dried under hood, and then rinsed with water and dried.

The rinsed and dried surface of polyethylene was then immersed in the aqueous solution S at 20° C., with an immersion time indicated below, and then the surface was dried, and optionally rinsed with water as indicated in the table (when rinsed with water, the surface was then dried)

As a comparison, a blank (test no. 1) was performed in the same conditions, but without any pretreatment of the polyethylene surface; and another test (no. 6) as been performed with a commercial primer (namely the DUPLI-COLOR primer commercialized by Motip Dupli, applied by a spray coating according to the recommendation of the supplier).

After coating of the paint and drying overnight, the cohesion of the paint was tested by using a LUMIFRAC apparatus: a metallic plate was adhesive bonded on the backside of the sample (on the "non painted" face of the sample) and cured at 22° C., the painted surface was cleaned with ethanol (fibre free cloth) and then dried by evaporation for more 15 minutes. Then a stamp was adhesive bonded to the paint surface (with a two-component epoxy adhesive 3M Scotch Weld DP 490) and the surface with this stamp was placed in the LUMIFRAC apparatus, wherein it was submitted to an increasing centrifugation leading to an increasing traction force (linea load increase of 10 N/s), that can also be expressed as a traction strength σ on the surface of the stamp adhesive bonded to the paint, expressed in MPa. When the traction became to high, a delamination of the paint occurred, reflecting the cohesion of the paint. The table below gives the traction strength $\sigma_{limit}$ where the delamination occurred for each test (the higher $\sigma_{limit}$, the higher the cohesion).

TABLE conditions of each test and measured $\sigma_{limit}$

| | Test no.: | | | | | |
|---|---|---|---|---|---|---|
| | 1 (Blank) | 2 | 3 | 4 | 5 | 6. (comparative) |
| Immersion time in solution S | No immersion | 15 min | | 60 min | | Spray coating of Dupli Color |
| the treated surface is rinsed with water ? | — | no | yes | no | yes | no |
| $\sigma_{limit\ (MPa)}$ | 0.594 | 1.955 | 1.736 | 2.922 | 2.395 | 3.224 |

The invention claimed is:

1. A process for bonding two hydrophobic surfaces, the process comprising:
   (E1) contacting the two surfaces at least on certain zones with a primary coating composition consisting essentially of a cationic polysaccharide, wherein the cationic polysaccharide is a cationic guar, and wherein the composition is free of ionic surfactant, whereby a coating based on said cationic polysaccharide is obtained on said zones of the surfaces,
   (E2) injecting an aqueous composition, wherein the aqueous composition is an adhesive, between all or part of the zones of the surfaces covered by the cationic polysaccharide, as obtained in step (E1).

2. The process according to claim 1, wherein the cationic guar has a molecular weight between 20,000 and 5,000,000 g/mol.

3. The process according to claim 1, wherein the cationic guar is guar modified by quaternary ammonium cationic groups.

4. The process according to claim 3, wherein the quaternary ammonium cationic groups are ammonium groups carrying three radicals which are identical or different and selected from the group consisting of hydrogen and alkyl radical having from 1 to 22 carbon atoms.

5. The process according to claim 4, wherein the quaternary ammonium cationic groups are trialkylammonium.

6. The process of claim 1, wherein the adhesive is a waterborne adhesive.

* * * * *